United States Patent
Faust et al.

(10) Patent No.: US 11,197,743 B2
(45) Date of Patent: Dec. 14, 2021

(54) METHOD FOR PRODUCING A PROSTHESIS OR PARTIAL PROSTHESIS

(71) Applicant: Ivoclar Vivadent AG, Schaan (LI)

(72) Inventors: Alexander Faust, Berneck (CH); Philipp Muhmenthaler, Binningen (CH)

(73) Assignee: Ivoclar Vivadent AG, Schaan (LI)

( * ) Notice: Subject to any disclaimer, the term of this patent is extended or adjusted under 35 U.S.C. 154(b) by 0 days.

(21) Appl. No.: 16/323,670

(22) PCT Filed: Aug. 8, 2017

(86) PCT No.: PCT/EP2017/070001
§ 371 (c)(1),
(2) Date: Feb. 6, 2019

(87) PCT Pub. No.: WO2018/029163
PCT Pub. Date: Feb. 15, 2018

(65) Prior Publication Data
US 2019/0175315 A1    Jun. 13, 2019

(30) Foreign Application Priority Data
Aug. 10, 2016  (DE) .................... 10 2016 114 825.3

(51) Int. Cl.
*A61C 13/00* (2006.01)
*A61C 13/01* (2006.01)
(Continued)

(52) U.S. Cl.
CPC ...... *A61C 13/0004* (2013.01); *A61C 13/0006* (2013.01); *A61C 13/01* (2013.01); *A61C 13/08* (2013.01); *A61C 13/1003* (2013.01)

(58) Field of Classification Search
CPC ........... A61C 13/0004; A61C 13/0006; A61C 13/01; A61C 13/18; A61C 13/1003;
(Continued)

(56) References Cited

U.S. PATENT DOCUMENTS 10,182,893 B2    1/2019  Baaske et al.
2006/0257824 A1  11/2006 Pfeiffer et al.
(Continued)

FOREIGN PATENT DOCUMENTS

DE  102013003913 A1  9/2014
EP       1832245 B1   3/2011
(Continued)

*Primary Examiner* — Nicholas D Lucchesi
*Assistant Examiner* — Mirayda A Aponte
(74) *Attorney, Agent, or Firm* — Ann M. Knab; Thad McMurray

(57) ABSTRACT

A method for generating a prosthesis or partial prosthesis based on digital data using a plurality of teeth (10) and a prosthesis base (12) to be manufactured, characterized in that the generatively or subtractively generated teeth (10) and/or the generatively or subtractively generated prosthesis base (12) are manufactured having oversize, apart from regions of the teeth (10) and the prosthesis base (12) on which the teeth (10) and the prosthesis base (12) abut against each another and/or are joined or connected to each other, and in that the teeth (10) and/or the prosthesis base (12) are subsequently brought to the desired original dimension, in particular milled, with at least partial removal of the oversize (30, 32).

18 Claims, 3 Drawing Sheets

(51) Int. Cl.
*A61C 13/08* (2006.01)
*A61C 13/10* (2006.01)

(58) Field of Classification Search
CPC ..... A61C 8/0048; A61C 8/00; A61C 13/0001; A61C 13/10; A61C 13/235; A61C 13/28; A61C 13/34; A61C 13/0003
USPC .................................. 433/201.1; 264/16–17
See application file for complete search history.

(56) References Cited

U.S. PATENT DOCUMENTS

| | | | |
|---|---|---|---|
| 2013/0101962 A1* | 4/2013 | Howe | ............... A61C 13/0022 433/191 |
| 2014/0080094 A1 | 3/2014 | Howe | |
| 2014/0370463 A1 | 12/2014 | Renz et al. | |

FOREIGN PATENT DOCUMENTS

| | | | | |
|---|---|---|---|---|
| EP | 2742907 A1 | 6/2014 | | |
| JP | 2015-136520 A | 7/2015 | | |
| WO | 9623481 A1 | 8/1996 | | |
| WO | 2013124452 A1 | 8/2013 | | |
| WO | 2015/055790 A1 | 4/2015 | | |
| WO | 2016/041937 A1 | 3/2016 | | |
| WO | WO-2016041937 A1 * | 3/2016 | ............ | B29C 64/00 |

\* cited by examiner

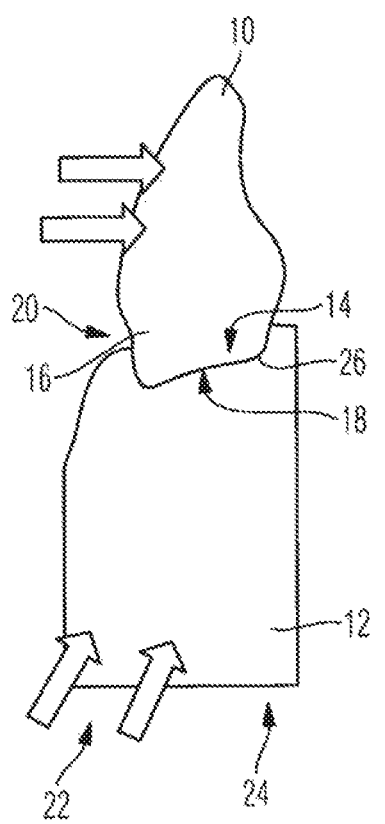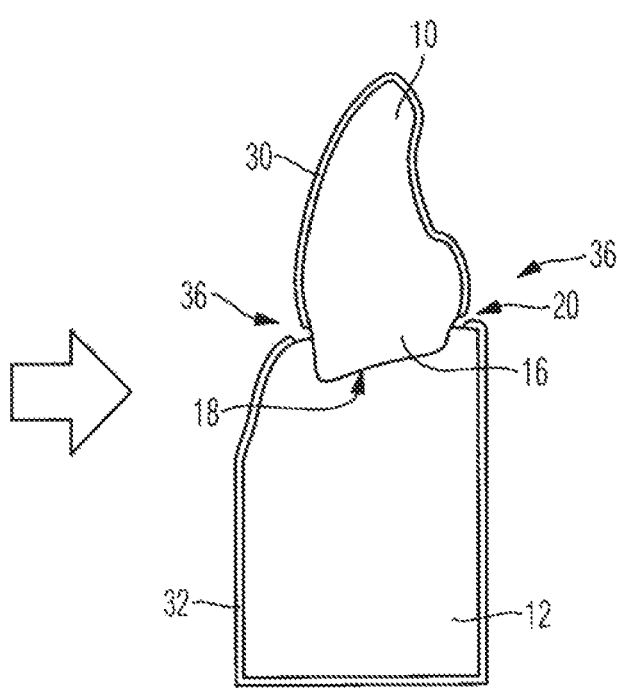
Fig. 1A
Fig. 1B

METHOD FOR PRODUCING A PROSTHESIS OR PARTIAL PROSTHESIS

CROSS-REFERENCE TO RELATED APPLICATIONS

This application is a National Stage application of International patent application PCT/EP2017/070001 filed on Aug. 8, 2017, which claims priority to German patent application No. 102016114825.3 filed on Aug. 10, 2016, the disclosures of which are incorporated herein by reference in their entirety.

FIELD OF THE INVENTION

The invention relates to a process for the production of a prosthesis or partial prosthesis, as well as a prosthesis, according to the attached claims.

BACKGROUND OF THE INVENTION

To produce a prosthesis or partial prosthesis it is known to mill the prosthesis including the prosthesis base from a plastic part. This is done in a manner known per se, for example based on the "Digital Denture" procedure, as it has basically become known from EP1 832 245 B1.

The disadvantage resides in that the gingival margin is not reproducible by 100% and in that two planes are on top of each other. A mathematically rigid line is required to be followed herein.

The denture base is typically milled out of a plastic material, wherein the tooth recesses are simultaneously milled.

The teeth can also be milled using any suitable material, such as a composite or ceramic material. Alternatively, preformed teeth can also be used; in this case, the tooth recesses are adapted to the basal shape of the teeth.

EP 2 742 907 A1 provides improvement on integrating the teeth into the denture base, representing considerable advance over the previously known solutions.

The teeth can be realized either as single teeth, or as a dental arch, in which the adjacent teeth are connected to each other by constriction.

If single teeth are used, it is advantageous to use the transfer template known from WO 2015/055790 A1.

Connection between the teeth and the denture base must, in any case, be testable and, in particular, permanently durable. For example, any suitable joint or composite compound, including an adhesive can be used. The gap between the teeth and the denture base for the composite material can broadly be adapted to the composite material and other requirements by accordingly designing it by CAD. Typically, the thickness is between 80 µm and 200 µm, usually about 100 µm.

It is to be ensured that the composite compound introduced into the tooth recesses before the teeth are inserted is sufficient to completely fill the adhesive gap.

This is critical because an incompletely filled adhesive gap could result in loss of connection between the tooth and the tooth recess, apart from the fact that any remaining recess cannot be kept sterile.

For this reason, the usual method is to use excessive composite compound, which then oozes out of the adhesive joint and subsequently has to be removed.

Typically, the residual adhesive or composite compound which is swollen irregularly, is then manually removed. However, manual processing with a hand cutter is not only time-consuming, but also often produces inaccuracies between the designed and the actual prosthesis, associated with surface losses, especially in the region of the gingival margin. Due to the three-dimensional embodiment of the margin line, it is moved selectively or in parts if, for example, the dental technician removes too much material at one location, which is easily to occur during manual post-processing.

If, on the other hand, the dental technician—when trying not to damage the gingival margin—acts too carefully, an excess of joint material will remain, which as well is aesthetically unsatisfactory.

Furthermore, it has already been proposed to provide a non-specifically provide excess of material during a rapid prototyping process and to subsequently remove it. However, this raises the same problems as mentioned above and this procedure has not been successful.

SUMMARY OF THE INVENTION

On the other hand, the object of the invention is to provide a process for producing a prosthesis or a partial prosthesis according to the attached claims and a prosthesis according to the attached claims, which is to be further improved with regard to the manufacture of the prosthesis, wherein significant progress has been made in particular with regard to efficiency in manufacture, but also with regard to the aesthetic result.

According to the invention, this object will be solved by the attached claims. Advantageous further embodiments will arise from the subclaims.

In the region of the connection between teeth and prosthesis base, it is provided to virtually create an impression of the original tooth, in contrast to the original tooth. CAD is used to briefly add a 0.2 mm oversize of the outer shape of the teeth and/or denture base, for example in the region at least above and below the gingival margin, e.g. at a height of 10 mm. The oversize is not provided at the points where the teeth and prosthesis base are joined or contact each other, but only outside of those regions. Thus, the joint gap is maintained in the manner known from prior art, wherein the tooth recess is generously filled with composite compound, so that it is ensured that the joint gap is generously filled with joint compound or composite compound after insertion of the teeth, so that there are no more air gaps.

When removing the oversize, it is of specific advantage that the joint compound or composite compound, as such, is automatically removed as well, if it is present in excess.

Thus, a more complex and manual step, which so far has been required and which was also prone to failure, can be omitted.

In the case of a one-piece dental arch, in which the mesial and distal sides of the teeth are connected by constrictions, the teeth can be inserted into the tooth recesses by hand, or by means of a transfer template according to WO 2015/055790 A1.

The composite material is then cured using a known clamping device, for example, or any other device by which the desired contact pressure between the teeth and the denture base can be maintained to ensure safe curing of the composite compound.

According to the preferred embodiment of the method of the invention, following curing, it is provided to re-clamp the denture base, which is now provided with teeth, back in the milling device. The now hardened excess of composite compound, which can as well be referred to as excess of adhesive, is removed by milling, as is the oversize of the teeth and/or the denture base, so that both the gum margin and the teeth as well as the denture base are in the original size.

In a modified embodiment, which reduces re-clamping inaccuracy to zero, it is to provide the dental arch, adhesive application and to provide the unit including the dental arch in the milling machine in the workpiece holder in the state of the denture base being clamped.

This can easily be achieved through the open door of the switched off milling machine, wherein herein it is of course as well advantageous to use an appropriate clamping device, pressing the dental arch with the basal area of the teeth into the tooth recesses.

Following curing of the adhesive, the 0.3 mm oversize, for example, will be removed, so that the teeth, denture base and gingival margin or gum margin each have the original dimension.

It is of particular advantage that the chain-line shaped gingival margin can be present exactly as designed with the help of the CAD program through mechanical removal of excessive adhesive, so that the aesthetic result of the prosthesis is considerably improved.

According to the invention, it is also advantageous that considerable time savings are possible compared to manual removal of excessive adhesive. For example, oversize and excessive adhesive can be removed by milling in a short period of time, for example in three minutes, while manual removal could easily require 30 or 40 minutes.

The oversize does not necessarily have to be provided for both the denture base and the teeth.

For example, it is also possible to use pre-formed teeth in standard sizes, i.e. without oversize, and, for example, to manufacture the denture base having an oversize of 0.15 mm. Nevertheless, cleaning and removal of adhesive residues can quickly and mechanically be performed in a suitable manner.

The region adjacent to the gingival margin is preferably free of oversize, i.e. in the original size. In this transitional area, which can be, for example, 1 mm or 2 mm high, a large portion of the excessive adhesive accumulates, making it easier to remove.

According to the invention, it is also of particular importance that the adhesive inaccuracy can be compensated for in the absence of a transfer template by implementing a tooth oversize, followed by milling to the original size. The teeth or the dental arch can also be imprinted into the tooth recesses without a transfer template, and following hardening, the original dimensions of the teeth are still precisely realized on the basis of the second milling step.

The invention is not limited to the use of single teeth. Instead of single teeth, tooth segments or dental arches can also be used, wherein the tooth segments can be mono-bloc or multi-bloc. For example, a full prosthesis provided for 14 teeth can be fabricated in three portions with two trios and one arch of 8 teeth (3+3+8). In this respect, the invention is not limited to the type of division of the teeth, the tooth segments or the dental arch.

If only the teeth are to be provided with oversize, milling operation is required to be carried out only thereon—and of course in the area of the gum line. This is particularly time-saving, especially when using well-milled composite teeth.

In a modified embodiment, it is provided that only a defined region having a height of, for example, 10 mm is manufactured, with an oversize adjoining the gingival margin, i.e. above and below the gingival margin, and, during the second milling operation, is milled to the original dimension. With this solution, only this region is subsequently traversed again with the milling machine and milled to original dimensions.

With this solution, even a very small virtual oversize of only 0.05 or 0.1 mm can be realized. The tooth having oversize then differs only by a very small thickness from the tooth having original dimensions.

In another modified embodiment, it is provided to mill the usual teeth and denture base, which are glued in the usual way, to the original size again. Herein, milling can be restricted, for example, to a band of 6 mm on the denture base and 4 mm on the tooth surface. This is extremely time-saving. However, a separate milling strategy is required to avoid damage of the tooth.

According to the invention, it is particularly advantageous that excessive joint material is automatically removed in one step. This results in better quality and improved appearance of the gingival margin area, and also results in considerable time savings.

It is to be understood, that the oversize, i.e. the additional layer thickness applied to the tooth and/or denture base, which differs from the original oversize, can, in a wide range, be adapted to the requirements. For example, a thickness in the submilimeter range is possible, especially between 0.05 and 0.8 mm, preferably about 0.3 mm. The oversize can be a constant layer thickness, but it is also possible to realize the oversize as having an unequal layer thickness.

If this is the case, the oversize in the occlusal or incisal area, for example, can be selected more generously. This is due to the geometric effect of any "cant" of the tooth in the tooth recess if the tooth is embedded in the tooth recess without a transfer template.

An inclined position in the tooth recess then has the effect that the inclined position is lowest in the contact area between the prosthesis and the tooth, i.e. in the basal area, and greatest in the area of the tooth remote from the basal area. However, this is the incisal or occlusal area.

This can be taken into account with an appropriate virtual correction, so that the oversize in the area of the gingival margin is the smallest. The area immediately adjacent to the gingival margin is preferably free of oversizes anyway. Both the tooth and the prosthesis are thus present in their original dimensions, for example in a 1 mm high band surrounding the gingival margin.

Oversize at the denture base is not directly correlated to the oversize on the teeth. If the only purpose of the setup without transfer template is to compensate for tooth position errors, the denture base can be fabricated in the original dimension, i.e. free of oversize, and the teeth can be fabricated having oversize. If only excessive adhesive is required to be removed, the oversize of the teeth can also be reduced to 0 or close to 0, in a modified embodiment.

The milling device is subsequently set such that the original dimension is again used in the second milling operation, wherein it is understood that care must accordingly be taken to ensure that a tooth that already exists in its original dimension will not be damaged. If pre-formed teeth are used, they typically are in the original size. The oversize removal can then be reduced to the prosthesis base and the excess adhesive; in this respect, re-clamping errors or re-clamping inaccuracies can also be corrected retrospectively. In any case, it is important to remove excess of joint material.

Any suitable material suitable for filling the gap between the tooth recess and the tooth in the basal area can be used as the joint material. Typically, tooth adhesives known per se are used herein, which ooze out of the adhesive gap, where the excess is removed by milling after hardening.

The area free of oversize adjacent to the gingival margin is herein referred to as the transitional area. It can also be completely filled with excessive adhesive, so that the excess can suitably be removed by milling in one run.

Setting the size of the oversize is a function of a retention accuracy of the prosthesis base in the milling machine, which has a deviation of less than +/−50%. The oversized shape can be three times as large as a joint compound or composite compound between the prosthesis base and teeth.

BRIEF DESCRIPTION OF THE DRAWING

Further advantages, details and features will arise from the following description of an example embodiment of the invention while making reference to the drawing, wherein:

FIGS. 1A and 1B are schematic views of the actual transfer of a tooth in the denture base in the original dimension into a tooth in the denture base having the original oversize, which is reduced back to the original dimension;

DETAILED DESCRIPTION

Figure 2A:
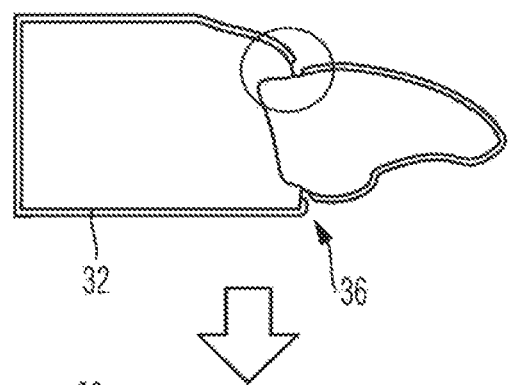
FIGS. 2A, 2B and 2C are detailed representations of realization of the oversize as shown in FIGS. 1A and 1B.

A prosthesis consisting of teeth 10 schematically shown in FIG. 1 and the prosthesis base 12 schematically shown in FIG. 1 is fabricated using the procedure according to the invention.

To accommodate the teeth, the denture base has one tooth recess 14 each, with a gingival area 16 of tooth 10 each being accommodated in the tooth recess. In a manner known per se, each tooth has an essentially flat, slightly concave basal surface 18, and the tooth recess 14 is shaped accordingly.

The transition between tooth 10 and the denture base 12 is typically referred to as the gingival margin or gum margin 20. It is present both on the vestibular side 22 and on the oral side 24. As seen from a vestibular point of view, the gingival margin forms a chain line in a manner known per se, representing a prominent red/white transition in the patient's mouth, especially in the anterior region.

In the virtual model of a tooth 10 with denture base 12 shown in FIG. 1, a gap 26 is provided at the transition between those two teeth. This gap is subsequently to be filled with joint compound or glue. When the soft adhesive is applied, it is squeezed out of gap 26 and flows into the area of the gingival margin 20.

However, FIG. 1 first shows the virtual model of this tooth 10 with the denture base 12 in the relevant part. The denture base is in the left part of FIG. 1, as shown in the original size.

On the other hand, in the part of FIG. 1 shown on the right, both tooth 10 has an oversize 30 and the denture base 12 has an oversize 32. This is generated virtually by CAD and represents a volume increase with constant layer thickness compared to the original dimension.

However, the transition area 36 between tooth 10 and the denture base 12 is free of oversize 30 or 32. Therefore, the gingival margin 20 is free, but is covered by excess of adhesive, which is not to be seen in FIG. 1, if the CAD virtual model is actually produced by milling.

Figure 2B:
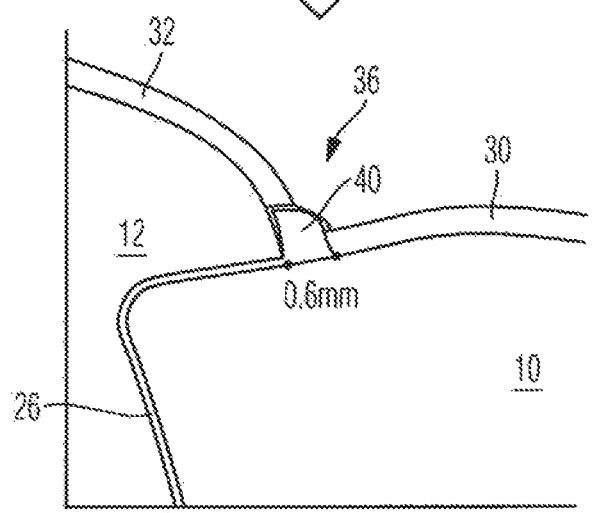
Figure 2C:
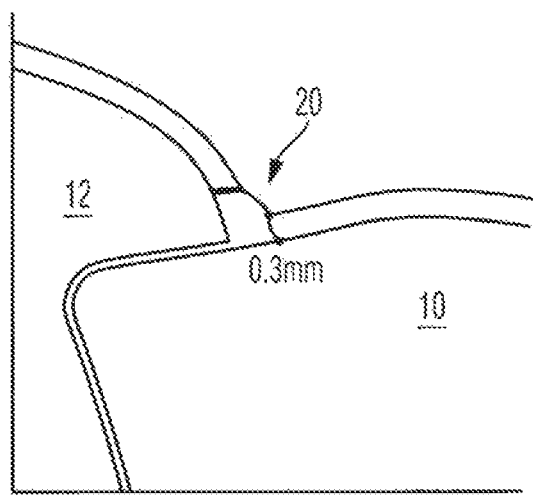

From FIG. 2 it may be seen, how this excess of adhesive presents itself. FIG. 2 above initially shows the right figure in FIG. 1 and then in the center a larger section thereof. The same reference signs here as in the other figures are shown for the same parts. Gap 26 is completely filled with adhesive. However, the adhesive laterally oozes out of the gap 26, forming excess 40 of adhesive or joint compound thereon.

In the example embodiment shown, the excess of adhesive 40 completely fills out the transition area 36, so that the oversize 32 more or less seamlessly follows the excess adhesive to oversize 30.

FIG. 2 also shows possible dimensions for the upper transition area 36 and the thickness of the oversize thereon, wherein the upper transition area is about 0.6 mm high, as calculated from the gingival margin 20, on both sides, i.e. 1.2 mm in total, and wherein the layer thickness of the oversize 30, but also that of the oversize 32, is about 0.3 mm.

It is to be understood that excess 40 as a typical adhesive bulge changes over the course of the gingival margin 20 and is sometimes thicker and sometimes less thick.

Figure 3A:
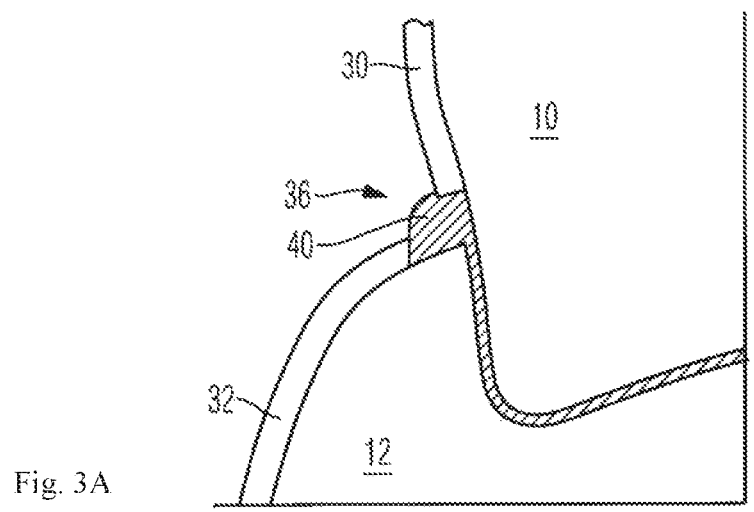
FIGS. 3A and 3B are schematic representations of the distance of the oversize or the excess of joint compound for a method according to the invention in the embodiment according to FIGS. 1A, 1B, 2A, 2B and 2C.
Figure 3B:
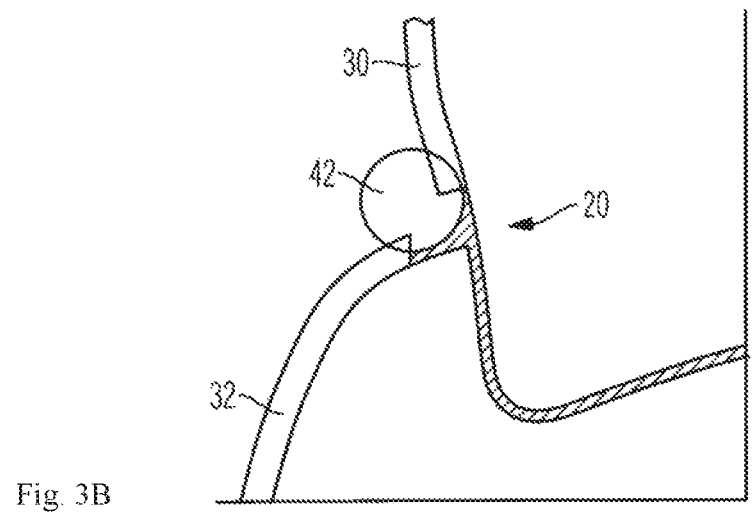

In accordance with the invention, not only excess 40, but also oversize 32 and oversize 30 are now removed from the upper transition area 36, the denture base 12 and tooth 10, as shown in FIG. 3. For this purpose a milling cutter 42 is used, the radius of which is small enough to easily follow the contour of the gingiva margin 20, so that the gingiva margin 20 is precisely machined as a chain line, showing an aesthetically successful appearance to the observer.

It is to be understood that the oversize 30 and the oversize 32, i.e. the associated additional material that each was left after the first milling operation, is removed in a one-step operation.

It is also understood that, depending on the milling cutter used during the first milling step, a tool change can be made by using a milling cutter having a smaller diameter, specifically for the second milling step.

The prosthesis according to the invention is characterized by high precision without any misalignment of the teeth, even if no transfer template is used for installation, but the result is still aesthetically very successful.

The invention claimed is:

1. A method for producing a prosthesis or partial prosthesis based on digital data, using a plurality of teeth and a prosthesis base, the method comprising
   producing a plurality of teeth and a prosthesis base each having an oversize apart from areas of the teeth and the prosthesis base where the teeth and the prosthesis base abut one another and/or are joined or connected to each another,
   wherein the oversize comprises an outer shape of the teeth and an outer shape of the prosthesis base in regions above and below the gingival margin leaving a gap at the regions above and below the gingival margin to allow a joint compound or a composite compound to exit,
   wherein the teeth and prosthesis base are generatively or subtractively produced, and
   wherein subsequently the teeth and/or the prosthesis base is/are brought to a desired dimension with at least partial removal of the oversize.

2. The method according to claim 1,
   wherein the oversize is smaller, equal or larger in size than a joint compound or a composite compound between the prosthesis base and teeth.

3. The method according to claim 2,
wherein an edge region of the joint compound or the composite compound surrounding and forming a gingival margin is lacking an oversize.

4. The method according to claim 2,
wherein the oversize is subtractively removed together with excessive joint compound or composite compound and by CAM milling.

5. The method according to claim 1,
wherein the oversize at the prosthesis base is smaller, equal or larger in size than the oversize at the teeth.

6. The method according to claim 1,
wherein the teeth are jointly produced as a dental arch or as a dental segment forming a chain line towards the prosthesis base, as viewed from the vestibular direction, which chain line extends below the gum margin.

7. The method according to claim 1,
wherein the teeth and/or prosthesis base are brought to the desired dimension by milling.

8. The method according to claim 1,
wherein the oversize is three times as large as a joint compound or composite compound between the prosthesis base and teeth.

9. A method for producing a prosthesis or partial prosthesis based on digital data using a plurality of teeth and a prosthesis base and joint compound or composite compound between the teeth and prosthesis base, the method comprising
producing the teeth in an original size as ready-made teeth and
producing the prosthesis base having an oversize apart from areas of the prosthesis base where the teeth and the prosthesis base abut one another and/or are joined or connected to each another,
wherein the oversize comprises an outer shape of the prosthesis base in regions below the gingival margin,
wherein the oversize is removed together with excessive joint compound or composite compound at the gum margin or gingival margin.

10. The method according to claim 9 comprising
producing the prosthesis base with the oversize at the prosthesis base substantially having the same thickness throughout in the range of between 0.05 and 0.8 mm or between 0.1 and 0.5 mm.

11. The method according to claim 9 comprising
manufacturing the prosthesis base by a milling method using a milling machine,
wherein the prosthesis base comprises tooth recesses, and
removing the oversize at the prosthesis base together with excessive joint compound or composite compound in the region of the gingival margin using the milling machine.

12. The method according to claim 11, comprising
inserting the teeth into tooth recesses of the prosthesis base without a transfer template, and
wherein milling to an original dimension simultaneously eliminates joint compound or composite compound inaccuracy.

13. The method according to claim 11 comprising
manufacturing the teeth which are prefabricated teeth having an original dimension,
manufacturing the prosthesis base having an oversize, and
removing the oversize after the teeth have been joined to the prosthesis base by a transfer template.

14. The method according to claim 11 comprising
manufacturing the teeth and/or the prosthesis base having an additional virtual oversize of less than 0.2 mm, by means of which a retention inaccuracy during milling away the oversize is compensated.

15. The method according to claim 14,
wherein the additional virtual oversize is less than about 0.1 mm.

16. A prosthesis comprising
a prosthesis base, and
a plurality of teeth which are combined in a dental arch or in a tooth segment,
wherein the teeth are glued into tooth recesses of the prosthesis base by a joint compound or composite compound while bridging a joint/composite joint,
wherein in a first state of the prosthesis, at least the prosthesis base and the teeth have an oversize between 0.05 and 1.0 mm,
wherein the oversize comprises an outer shape of the teeth and an outer shape of the prosthesis base in regions above and below the gingival margin of the combination of the prosthesis base with the teeth installed, and
wherein the oversize can be removed down to an original dimension as a target value, by an ablative method.

17. The prosthesis according to claim 16,
wherein in the first state, the prosthesis has excess of joint compound or composite compound adjacent to the joint/composite joint in the region of the gingival margin or gum margin, at which point at least the prosthesis base and also the teeth are lacking oversize.

18. The prosthesis according to claim 17, comprising
a transition region (36) between the oversize region of the prosthesis base and the oversize region of the teeth,
characterized in that the transition region is filled by excess of the joint compound or the composite compound.

* * * * *